H. WIARD & A. J. SPIRE.
REVERSIBLE PLOW.
APPLICATION FILED MAY 2, 1910.
1,069,835.
Patented Aug. 12, 1913.
3 SHEETS—SHEET 3.
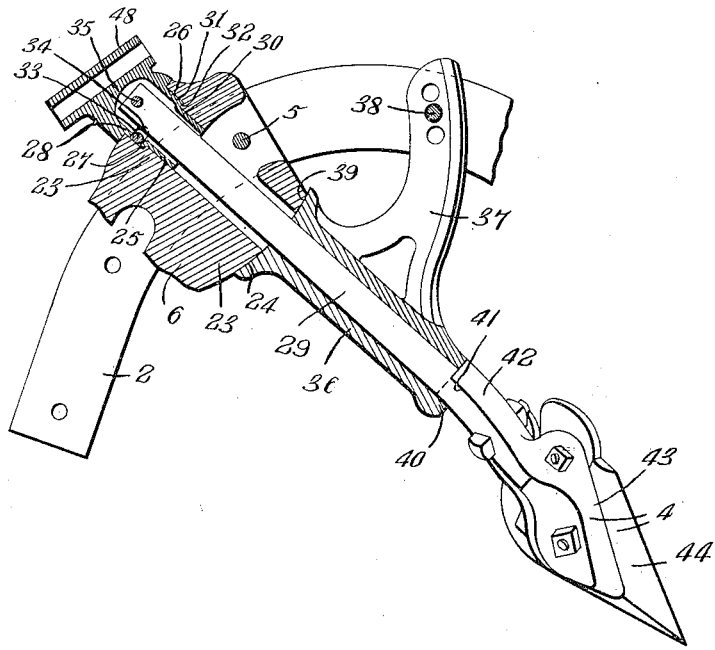
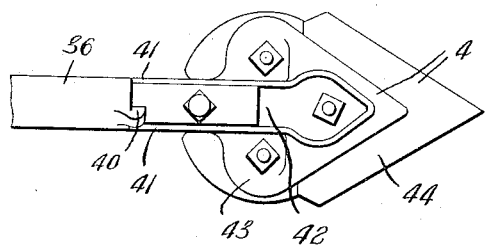

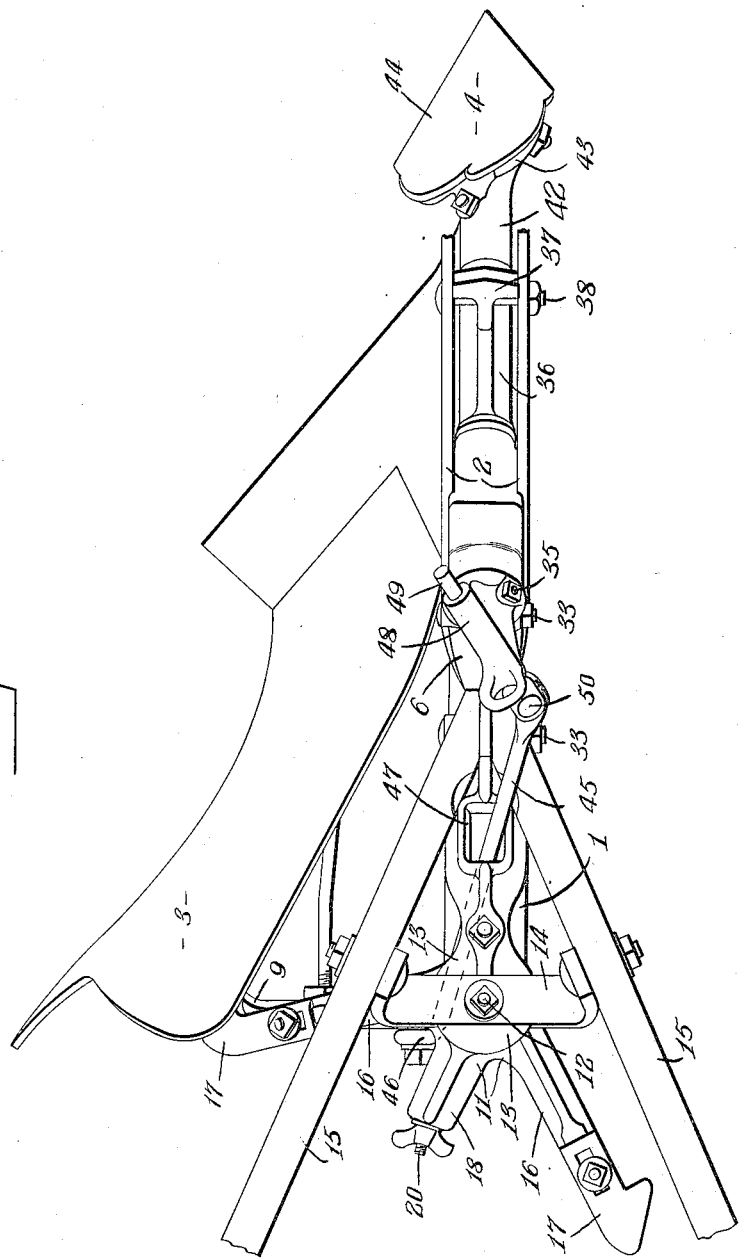

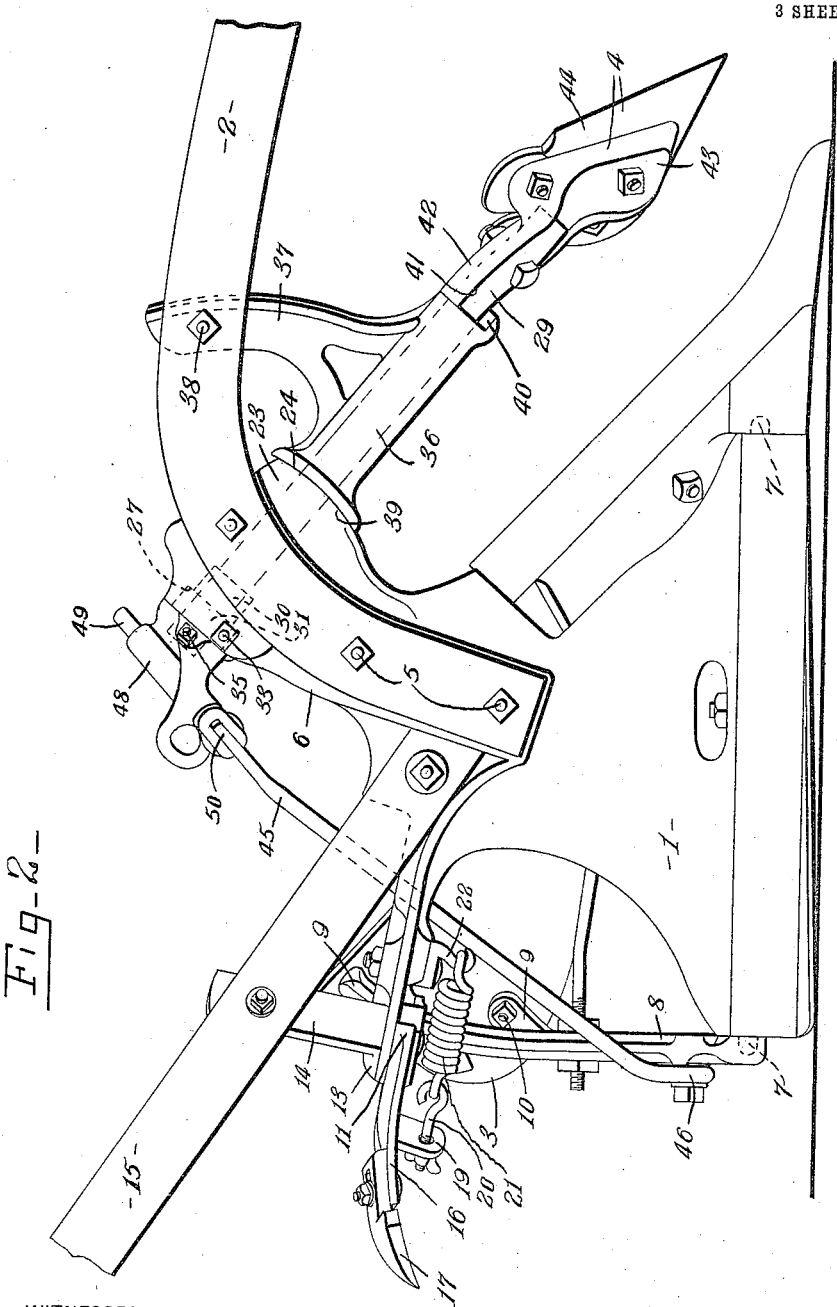

UNITED STATES PATENT OFFICE.

HARRY WIARD AND ALVIN J. SPIRE, OF SYRACUSE, NEW YORK; SAID SPIRE ASSIGNOR TO SYRACUSE CHILLED PLOW COMPANY, OF SYRACUSE, NEW YORK, A CORPORATION OF NEW YORK.

REVERSIBLE PLOW.

1,069,835.

Specification of Letters Patent. Patented Aug. 12, 1913.

Application filed May 2, 1910. Serial No. 558,764.

*To all whom it may concern:*

Be it known that we, HARRY WIARD and ALVIN J. SPIRE, of Syracuse, in the county of Onondaga and State of New York, have invented a certain new and useful Reversible Plow, of which the following is a specification.

Our invention relates to reversible plows and has for its object a particularly simple, efficient and durable means for supporting and operating the reversible turf cutter, and controlling the movement thereof, and it consists in the combinations and constructions hereinafter set forth and claimed.
In describing this invention reference is had to the accompanying drawing in which like characters designate corresponding parts in all the views.

Figure 1 is a plan, partly broken away, of this reversible plow. Fig. 2 is a side elevation of parts seen in Fig. 1. Fig. 3 is a vertical sectional view, partly in elevation, illustrating the turf cutter and contiguous parts. Fig. 4 is a face view of the main portion of the turf cutter and the stop therefor.

1 is the standard, 2 the beam, 3 the earth-turning element, and 4 the turf cutter of the plow. The beam 2 comprises opposing sections having their rear ends spaced apart and fixed by bolts 5 to opposite sides of an upwardly extending arm 6 on the standard 1. The earth-turning element 3 is shiftable from either side of the standard to the other into position to turn right or left furrows, and is here illustrated as pivotally mounted on trunnions 7, extending forwardly and rearwardly from the standard 1 near the bottom thereof, a rock arm 8 being pivoted on the rear trunnion and extending upwardly therefrom and formed with diverging branches 9 connected, as at 10, to the rear end of the mold board of the earth-turning element 3. This earth-turning element 3 is held in either of its operative or plowing positions by suitable means, as a shiftable member 11, secured by a vertical pivot 12 to a rearwardly extending arm 13 of the standard, the pivot 12 extending through the bail of a U-shaped brace 14, the branches of which are extended upwardly and secured to the handles 15 of the plow. As here illustrated the shiftable member 11 comprises substantially radial arms 16 extending laterally in opposite directions and provided at their ends with adjustable hooks 17 for engaging the branches 9 of the arm 8 when said element is in either of its operative or plowing positions. Said member 11 also includes a rearwardly extending substantially radial arm 18 located about midway between the arms 16, and provided with a depending ear 19 carrying a part 20, as a screw, arranged at the rear of the pivot 12 and adjustable toward and from said pivot.

When it is desired to shift the earth-turning element 3, the standard 1 is raised off the ground by lifting the handles 15, the member 11 is moved manually on its pivot 12 sufficiently to carry one hook 17 out of engagement with the branch 9 coacting therewith, and is thereupon moved by a spring 21 an additional distance in the same direction to arrange its other hook 17 in operative position and meanwhile the element 3 swings about its axis under, and to the opposite side of the standard and engages the other branch 9 with said other hook 17. This spring 21, which is preferably an extensible coiled spring, is arranged below the shiftable member 11, is connected at its forward end in front of the pivot 12 to hook shaped means 22 provided on the arm 13 of the standard 1, and is connected at its rear end to the adjustable part 20 carried by the intermediate radial arm 18. During the shifting movement of the member 11 from either of its operative positions, the intermediate portion of the spring 21 moves from one side of the pivot 12 of the member 11 to the other side of said pivot, and when the member 11 has been moved manually sufficiently to carry the intermediate portion of the spring 21 past the pivot 12, said spring completes the movement of the member 11 and forces the same into its other operative position.

The turf cutter 4 is usually of the jointer type and is provided with a shank journaled at its upper end in a bearing 23 associated with the arm 6 of the standard, and inclining downwardly and forwardly from its upper end. Said bearing 23 is formed with an arcuate or convex face 24 at its lower end and comprises a lengthwise journal opening having its lower portion 25 opening through the face 24 and formed of less diameter than its upper portion 26, said journal opening also having an upwardly facing annular bearing face 27 between said portions 25 and 26.

The shank of the turf cutter is composed of upper and lower sections 28 and 29, the upper section 28 being hollow and mounted in the journal opening of the bearing 23 and including two cylindrical portions 30 and 31 of different diameters fitting respectively in the portions 25 and 26 of said journal opening, the upper section 28 of the shank also including an annular shoulder 32 arranged at the inner end of the larger cylindrical portion 30 and engaging the annular bearing face 27 of said bearing 23. Said upper section 28 extends above the bearing 23 and is normally prevented from withdrawal out of the journal opening of such bearing by a pin 33 extending transversely through the bearing and passing through a peripheral groove or slot 34 in the section 28.

The upper end of the lower section 29 of the shank of the turf cutter is of less diameter than the lower end of the upper section of said shank and is extended into the internal cavity of said lower end and pivoted thereto by a transversely extending pivot 35. The lower section 29 of said shank is supported by means comprising a sleeve 36 and an arm 37, the sleeve 36 encircling said lower section 29 and terminating near the main portion of the turf cutter, and the arm 37 rising from the sleeve 36 intermediate of its ends and extending between the sections of the beam 2 and being adjustable relatively thereto in a substantially vertical plane.

A bolt 38 extending through one of a series of holes in the arm 37 and transversely through the sections of the beam 2, holds said arm in its adjusted position and thus causes this arm to firmly support the lower end of the turf cutter. The sleeve 36 abuts against the lower end face of the bearing 23 and is preferably provided with a concave face 39 coacting with the convex face 24 at the lower end of the bearing 23, said faces 39 and 24 being concentric with the pivot 35 connecting the contiguous ends of the upper and lower sections of the shank of the turf cutter. The lower end of the sleeve 36 is provided with means for limiting the turning of the shank of the turf cutter, the same being here shown as a lengthwise projecting shoulder 40 extending between the longitudinal edges 41 of a lengthwise slot in a sleeve 42 projecting upwardly from the main body 43 of the turf cutter, said main body being preferably provided with a detachable blade 44. The sleeve 42 embraces the lower end of the section 29 of the shank, and the shoulder 40 coacts with said edges 41 for limiting the turning movement of the turf cutter in opposite directions. Preferably, the upper end face of the sleeve 42 coacts with the lower end face of the sleeve 36 and relieves the pivot 35 from any strain due to the upward end thrust of the turf cutter.

The turf cutter is reversed during the shifting of the earth-turning element 3 by suitable means, here shown as a link 45 which is pivoted at its lower end at 46 to the rock arm 8, is pivoted at its upper end to the upper section 28 of the shank of the turf cutter, and fulcrums intermediate of its ends against opposite sides of an opening 47 extending vertically through the arm 13 of the standard 1. Usually the upper section of the shank of the turf cutter is formed with an elongated sleeve 48 arranged above the bearing 23 transversely of the axis of said section and obliquely relatively to the beam, and said sleeve supports a rod 49 slidable therein and pivoted at 50 to the upper end of the link 45. Owing to the construction of the turf cutter and its supporting means, said turf cutter is firmly supported and may be adjusted in a vertical plane without affecting the rigidity of its support.

What we claim is:

1. In a reversible plow, a standard having a bearing, a beam fixed to the standard, an earth turning element shiftable from either side of the standard to the other into position to turn right or left furrows, a reversible turf cutter having a shank journaled at its upper end in the bearing of the standard, the portion of the turf cutter contiguous to the blade being provided with a rearwardly facing bearing surface, connections between the earth turning element and the shank of the turf cutter whereby the turf cutter is reversed during the shifting of the earth turning element, and supporting means including a bearing sleeve encircling the shank and connected to the beam, one end of the bearing sleeve engaging the bearing surface contiguous to the blade portion of the turf cutter, substantially as and for the purpose described.

2. In a reversible plow, a standard having a bearing, a beam fixed to the standard, an earth turning element shiftable from either side of the standard to the other into position to turn right or left furrows, a reversible turf cutter having a shank journaled at its upper end in the bearing of the standard, the portion of the turf cutter contiguous to the blade having a bearing face associated therewith facing rearwardly, connections between the earth turning element and the shank of the turf cutter whereby the turf cutter is reversed during the shifting of the earth turning element, and supporting means including a bearing sleeve encircling the shank and connected to the beam, one end of the bearing sleeve engaging the bearing of the standard and its other end engaging said bearing face contiguous to the blade portion of the turf cutter, substantially as and for the purpose specified.

3. In a reversible plow, a standard, an earth turning element shiftable from either side of the standard to the other into position to turn right or left furrows, a shiftable member for holding the earth turning element in either of its plowing positions, said member being pivoted between its ends to the standard, and spring connected at its front end to the standard in front of said pivot and at its rear end to said member in rear of the pivot, the point of connection of the spring and said member being normally arranged passing through the pivot and the point of connection of the front end of the spring and the standard and being movable across said line during the shifting of said member, substantially as and for the purpose set forth.

4. In a reversible plow, a standard, an earth-turning element shiftable from either side of the standard to the other into position to turn right or left furrows, a shiftable member for holding the earth-turning element in either of its plowing positions, said member being pivoted to the standard, and comprising oppositely extending substantially radial arms provided with means for engaging the earth-turning element and a third substantially radial arm extending rearwardly and located midway between the former arms, the third arm including an adjustable part at the rear of the pivot for the shiftable member, and an extensible coiled spring for holding the shiftable member in either of its plowing positions, the spring being arranged beneath the shiftable member and having one end connected to the standard in advance of the pivot for the shiftable member, and having its other end connected to the adjustable part of the third arm of the shiftable member, and the intermediate portion of the spring being movable from either side of said pivot to the other during the movement of the shiftable member, substantially as and for the purpose described.

5. In a plow and in combination, a reversible cutting element, a standard provided with an arm having an arcuate bearing face and a lengthwise opening a portion of which provides a bearing, beams secured to the standard, and a turf cutter mechanism comprising a blade, a two-part shank, a bracket for securing the blade to one end of the shank, a sleeve providing a bearing for one section of the shank, said sleeve having one end coöperating with the arcuate face of said arm and its other end coöperating with the rear edge of said bracket and having a stop portion for coöperating with side edges of the bracket, an arm extending upwardly from the intermediate part of the sleeve, means for adjustably connecting the last-named arm to the beams and means secured to the other section of the shank and operating when the plow is reversed for rotating the shank about its longitudinal axis, said other section of the shank having a part journaled in the opening in the first-named arm and having a socket of greater diameter than the upper end of the first-named section of the shank for receiving such upper end, and means for connecting the two parts of the shank for preventing one part thereof from moving about its longitudinal axis independently of the other part and for permitting independent movement of the first-named part of the shank in the adjustment of the bearing sleeve, substantially as and for the purpose described.

In testimony whereof, we have hereunto signed our names in the presence of two attesting witnesses, at Syracuse, in the county of Onondaga, in the State of New York, this 23rd day of April, 1910.

HARRY WIARD.
ALVIN J. SPIRE.

Witnesses:
J. MANNING,
ALBERT W. EGERHOFER.

---

Copies of this patent may be obtained for five cents each, by addressing the "Commissioner of Patents, Washington, D. C."